United States Patent [19]
Burke et al.

[11] 3,884,908
[45] May 20, 1975

[54] STRONG ACID NEUTRALIZATION OF POLYMERIC ALCOHOL XANTHATES

[75] Inventors: N. I. Burke, Danville; D. J. Bridgeford, Champaign, both of Ill.

[73] Assignee: Tee-Pak, Inc., Chicago, Ill.

[22] Filed: Mar. 14, 1973

[21] Appl. No.: 340,988

[52] U.S. Cl.......... 260/218; 106/164; 260/79.5 NV; 260/217
[51] Int. Cl..................... C08b 9/00; C08f 27/06
[58] Field of Search............ 260/79.5 NV, 217, 218, 260/797, 91.3 VA

[56] References Cited
UNITED STATES PATENTS
| | | | |
|---|---|---|---|
| 1,880,041 | 9/1932 | Richter | 260/218 |
| 2,852,453 | 9/1958 | Hausner | 204/131 |
| 3,399,069 | 8/1968 | Bridgeford | 106/164 |

*Primary Examiner*—Christopher A. Henderson
*Attorney, Agent, or Firm*—Neal J. Mosely; Russell L. Brewer

[57] ABSTRACT

A process for neutralizing the free excess alkali in a polymeric alcohol xanthate comprises dispersing particulate polymeric alcohol xanthate in an inert liquid vehicle in which said xanthate is substantially insoluble, adding a substantially stoichiometric quantity of strong acid based on the free alkali content of said xanthate to said dispersion by small increments, and intimately mixing said increments of acid with said particulate xanthate at a rate such that free alkali is neutralized while leaving a xanthate of relatively high D.S.

9 Claims, No Drawings

STRONG ACID NEUTRALIZATION OF POLYMERIC ALCOHOL XANTHATES

BACKGROUND OF THE INVENTION

This invention relates to the preparation of finely divided alkali free xanthates of polymeric alcohols which are substantially stable at room temperature.

Cellulose xanthate was discovered by Cross and Bevin in 1892 and is prepared by the reaction of carbon disulfide and an alkali cellulose crumb. The alkali crumb is prepared by steeping a chemical grade cellulose in 15 – 20% aqueous caustic effecting mercerization and alkali cellulose formation, then draining the excess caustic therefrom and shredding the product to crumb form. Viscose is a relatively dilute aqueous alkaline solution of sodium cellulose xanthate.

Viscose is highly useful as it carries the cellulose in a form which can be used for making a variety of products. When viscose is aged and reaches desired ripeness, it can be extruded through a die into a coagulating or regenerating medium, e.g., ammonium sulfate and sulfuric acid, to form filaments, sheets, and tubular films. The coagulated cellulose conforms to the configuration of the die. Viscose can also be used for impregnating paper or fabric (including non-woven fabrics and webs) and then the cellulose regenerated by treatment with acid or heat to form a reinforced product.

Polymeric alcohols, other than cellulose, include carbohydrates and polysaccharides such as starch, amylose, dextran, polyvinyl alcohol, and polyallyl alcohol are known to form alkali derivatives from the corresponding xanthates and the conversion and regeneration of these polymeric alcohols present similar economic and technical problems associated with the purification and regeneration of cellulose from viscose.

Polymeric alcohol xanthates, including cellulose xanthate, are useful as intermediates in organic synthesis. These alcohols can be esterified by reacting with an alkyl halide, e.g., an alkyl alcohol xanthate ester. Additionally, because the xanthate radical is a strong nucleophilic group, the xanthates can be reacted by nucleophilic addition or by displacement reaction with an electrophilic material. Electrophilic reagents which can be reacted with the polymeric alcohol xanthates are aliphatic and aromatic aldehydes; aliphatic and aromatic isocyanates, both monofunctional and polyfunctional; urea and thiourea; cyanamide; cyclic amines such as ethyleneimine and derivatives thereof; halogenated organic compounds such as alkyl and aryl halides.

Alkali polymeric alcohol xanthates, such as sodium cellulose xanthate, can also be reacted with heavy metal salts to form an insoluble precipitate in water or dilute alkali. This precipitate then may be impregnated into a fibrous material and the polymeric alcohol regenerated. Other materials which can be reacted with the polymeric alcohol xanthate are set forth in U.S. Pat. No. 3,531,465.

By the very nature of the process by which a polymeric alcohol xanthate is prepared, there is always an excess of free alkali in the product. In addition to alkali, e.g., caustic soda, there is other alkaline material such as sodium trithiocarbonate present making up the free alkali content.

One of the many problems faced by those working with polymeric alcohol xanthates has been the removal of excess free alkali in the polymeric xanthate, that is, the removal of free caustic and the alkali trithiocarbonate. There are several reasons for obtaining an alkali free polymeric alcohol xanthate. One is that the alkali trithiocarbonate has a tendency to impart a yellowish color to products made from the polymeric alcohol xanthate. Another is that many of the nucleophilic additions and displacement reactions with an electrophilic material are encumbered by the presence of free alkali. For example, when the polymeric alcohol xanthate is not neutralized, there is a competing reaction involving the alkali trithiocarbonate and free caustic which react with and consume a large amount of the electrophilic reagent. A third reason is that often in the treating of fibrous materials with aqueous solutions of polymeric alcohol xanthate, it is desirable to regenerate the polymeric alcohol by heat. If free alkali is present, it remains in the polymer and often leaves the film discontinuous. Moreover, because the alkali is water soluble, it can be leached from the film. Regeneration by heat is sometimes preferred to acid neutralization because the acid washing has a tendency to wash away the polymeric alcohol xanthate after it has been deposited on the material.

The difficulty in preparing a neutralized polymeric alcohol xanthate, that is, one free of excess caustic and alkali trithiocarbonate, is that the polymeric alcohol xanthates are unstable in the presence of acid and decompose forming a polymeric alcohol and carbon disulfide. For example, cellulose xanthate when contacted with acid is regenerated to cellulose and carbon disulfide is liberated.

PRIOR ART

Several processes are disclosed in U.S. Pat. 3,291,789 for decausticizing or neutralizing various polymeric alcohol xanthates. In that patent, polymeric alcohol xanthates are decausticized by dialysis and/or by treatment with ion exchange or ion retardation materials.

Another process described in the literature is to neutralize cellulose xanthate crumb by using weak organic acids, e.g., dilute acetic acid. Neutralization is accomplished by treating the xanthate with dilute aqueous acetic acid and then immediately precipitating with saturated sodium chloride solution. The precipitate then is purified by washing with an alcohol forming a xanthate free of sodium hydroxide.

While the decausticized polymeric alcohol xanthate solutions described in the patent literature are useful for a variety of purposes, the problems of storage and cost of shipping these solutions because of large amounts of water present have retarded the commercial use. The water content in these solutions usually is about 92 – 93% by weight. Because of the high water content, it has been considered highly desirable to find an economic means to convert these materials into a dry, solid form for easy handling and shipping which is stable for extended periods of storage and which can be reconstituted by mixture with or dispersion in water and other solvent.

It has been proposed to spray dry the decausticized polymeric alcohol xanthate solution of U.S. Pat. No. 3,291,789 for forming a finely divided particulate product in Bridgeford U.S. Pat. No. 3,399,069. The main disadvantage of this process is that a large amount of water must be evaporated in order to form a dry particulate product.

Advantages of the instant process over the prior art for neutralizing polymeric alcohol xanthates (particularly cellulose xanthate) include: the ability to form the alkali free polymeric alcohol xanthate without dissolving the crumb to effect neutralization; the ability to use concentrated solutions of strong acids without regenerating the polymeric alcohol xanthate; the ability to form a finely divided dry product which can be stored for a substantial period of time; and the ability to form a dry product without requiring substantial evaporation of water as compared to spray drying of a neutralized polymeric alcohol xanthate solution.

SUMMARY OF THE INVENTION

The invention is based upon the discovery that polymeric alcohol xanthates, principally film-forming polyalcohol xanthates, such as cellulose, starch, amylose, dextran, polyvinyl alcohol, and polyallyl alcohol can be neutralized with strong acids without first requiring the formation of a solution.

The method for neutralizing an alkaline alkali metal polymeric alcohol xanthate for forming a particulate polymeric alcohol xanthate comprises forming a liquid mixture comprising finely divided alkali polymeric alcohol xanthate and an inert liquid vehicle in which said xanthate is substantially insoluble, adding a substantially stoichiometric quantity of strong acid based on the alkali content in the crumb in said liquid mixture by small increments and then mixing the polymeric alcohol xanthate and acid rapidly to neutralize the free alkali without regenerating the cellulose.

Although not intending to be bound by theory, it is believed the concept of the invention centers about the fact that the rate of reaction to effect neutralization of the free alkali is substantially greater than the rate of reaction for regeneration of cellulose from sodium cellulose xanthate. Under appropriate conditions, it is possible to neutralize the free alkali and alkali trithiocarbonate without regenerating the cellulose. Thus, the idea is to bring the alkali cellulose xanthate crumb in contact with a strong acid under conditions such that only that proportion of acid necessary to neutralize the free alkali and alkali trithiocarbonate is present during the reaction period and neutralizes the free alkali in a period of time less than that required for conversion of cellulose xanthate to regenerated cellulose.

In some instances, it is possible to neutralize all of the free alkali in a cellulose xanthate crumb. The pH of cellulose xanthate crumb (with free alkali neutralized) in water generally is about 8. Although 100% of the free alkali can be effectively neutralized, substantial care must be exercised in order to prevent regeneration of the cellulose. As the proportion of alkali is reduced by neutralization, particularly when substantially reduced, there is a tendency to create localized areas of strong acid concentration. These areas can effect a partial regeneration of the cellulose. On the other hand, when neutralization of the free alkali is not complete, one is afforded a buffer zone for reducing the tendency to form localized areas of acid.

In carrying out the neutralization of the polymeric alcohol xanthate, it is first comminuted to a particle size of about 24 mesh or smaller. When the particle size of the crumb exceeds about 24 mesh, it is extremely difficult to create a uniform concentration gradient of acid into the crumb for neutralizing the free alkali and alkali trithiocarbonate. Comminution to a particle size substantially below about 100 microns is not detrimental to the process in terms of the ability to neutralize the free alkali but generally does not improve the results and increases the cost. Sometimes, comminution to an extremely fine particle size causes decomposition because of temperatures reached in the comminutor.

A sample of crumb then is analyzed to determine the proportion of alkali and xanthate sulfur contained therein. With this analytical data, it is possible to determine the stoichiometric quantity of acid which will be required to effectively neutralize substantially all of the free alkali. In lieu of measuring the alkali content of the crumb and then calculating the stoichiometric quantity of acid required to neutralize the alkali, it is possible to make such determination by measuring the pH of the medium during the addition of acid. A neutral alcohol xanthate will have a pH in water of about 8 – 8.5 resulting from partial hydrolysis of the xanthate. It is possible to reduce the alkali content to a level such that the medium will have a pH of 6 – 6.5 but at this level the cellulose xanthate tends to become unstable. Generally, the neutralization is terminated at a point where the product has a pH of 6 – 10 when redissolved in water at a 1% concentration.

The finely divided alkali-containing polymeric alcohol xanthate crumb is dispersed into a liquid in which the alkali polymeric alcohol xanthate is substantially insoluble and inert. Substantially insoluble as used herein refers to a solubility of less than about 1 g of polymeric alcohol xanthate per 100 g of liquid vehicle. When the solubility of the polymeric alcohol xanthate in the liquid vehicle exceeds this proportion, there often is a pronounced regeneration of the polymeric alcohol. Of course, substantial solubility of the alkali portion in the liquid vehicle is not harmful and, in fact, is desired as this provides for a leaching of the alkali from the cellulose xanthate and provides greater surface area for neutralization.

The liquid vehicle should also be substantially inert to the polymeric alcohol xanthate at process conditions. By inert, it is meant that no reaction takes place between the polymeric alcohol xanthate and liquid vehicle. It is obvious that if the xanthate would undergo reaction in the liquid vehicle, it would be difficult to isolate the product for use as an intermediate inorganic synthesis or to isolate it for subsequent manufacture of a viscose solution. Examples of inert liquid carriers in which the polymeric alcohol xanthates are insoluble include aqueous salt solutions; mixtures of water and water miscible organic solvents; hydrocarbons such as pentane, benzene, toluene, hexane; hydrocarbon blends such as oil, kerosene, gasoline, mineral oil; aliphatic ketones such as acetone; dioxane; alcohols such as isopropanol, butanol, pentanol; dimethyl formamide, and so forth.

One preferred liquid carrier comprises water and an alkali metal salt of a strong acid such as sodium or potassium sulfate or sodium or potassium chloride. The presence of the salt performs two functions for making the liquid medium desirable. One is that the salt reduces the solubility of polymeric alcohol xanthate, e.g., cellulose xanthate, in the medium and the other is that it acts as a buffer in the presence of acid, preventing low pH values, e.g., 1 and below, which may effect conversion of the alkali cellulose xanthate to cellulose. For example, low pH values are avoided when sodium or potassium sulfate is used in combination with concentrated sulfuric acid as this provides for a buffer having a pH from about 1 – 2. On the other hand, concentrated sulfuric acid having a normality greater than 1 has a pH below 0. This difference often is significant in terms of the amount of cellulose regenerated.

Once the dispersion of liquid vehicle and polymeric alcohol xanthate particles is formed and the free alkali calculated, a stoichiometric quantity of acid is measured and the acid is added in small incremental quantities. Small incremental quantities help prevent conditions for a stoichiometric excess of acid within a given localized area. To further insure against conditions where a stoichiometric excess in a localized area may exist, the acid and polymeric alcohol xanthate mixture is exposed to high speed agitation. The mixing must be at high speed. This creates a thin interface of acid and polymeric alcohol xanthate crumb. Secondly, it changes this interface rapidly so that concentrated areas of acid are not in contact with the polymeric alcohol xanthate once that substantially all of the free alkali is neutralized at that locality. In essence, then, the addition of acid and mixing thereof is conducted at a rate which allows sufficient time for neutralization of the free alkali but insufficient to permit regeneration of the polymeric alcohol from the xanthate. Substantial regeneration of the polymeric alcohol refers to a xanthate sulfur loss resulting in a product having a very low D.S. of xanthate sulfur and which is substantially water insoluble.

Purification of the acid-neutralized polymeric alcohol xanthate can be accomplished by washing the water-soluble by-products therefrom. Generally, the by-products associated with the polymeric alcohol xanthate by such neutralization are the alkali metal salts of the acid used to neutralize the free alkali. If water is used to remove the salt, the rinse time should be very short in order to prevent losses through the solubility of cellulose xanthate in water. Other means for removal of by-products are known to those in the art, e.g., ion-exchange.

The following examples are provided to illustrate preferred embodiments of the invention. All temperatures are expressed in degrees Centigrade and all percentages are expressed as weight percentages.

EXAMPLE 1

PREPARATION OF ALKALI CELLULOSE XANTHATE CRUMB

A chemical grade cellulosic pulp sheet or board having a 50% wood - 50% cotton content was contacted with 19% aqueous caustic soda for a period of about one hour. After this contacting operation, commonly referred to as steeping, the excess caustic was drained from the cellulosic board and the board squeezed in a press producing a pressed board having a weight ratio of about three pounds wet pulp per one pound original cellulose. Then the pressed board was shredded into alkali cellulose crumb. The particle size of the alkali cellulose crumb averaged about one-sixteenth to one-fourth inch. The degree of polymerization (D.P.) of the alkali crumb was about 900 – 1,000.

After the crumb had aged at 25°– 30°C for about ten hours, the D.P. was about 550 – 600. The crumb was then converted into cellulose xanthate by charging a 10,000 g sample of the alkali cellulose crumb (containing about 3450 g of cellulose) to a baratte. The baratte initially was at a pressure of 760 mm. mercury absolute and the contents at a temperature of from about 28° – 30°C. Fifteen moles of carbon disulfide were charged to the reactor and the reaction allowed to continue at 28° – 30°C for a period of about 120 minutes.

The xanthate crumb produced by this procedure had a D.P. of about 500 – 550 and a xanthate sulfur content of about 24% (measured by the Fock method). The xanthate content drops rapidly on storage and in a few hours is in the range of 19 – 21%.

EXAMPLE 2

A 400 ml. quantity of water, 162 g sodium sulfate and 50 g of sodium cellulose xanthate crumb of Example 1 was added to a vessel and agitated. The liquid mixture then was comminuted for about 10 minutes at 25°C. A 98% aqueous sulfuric acid solution was added drop-wise to the slurry in the comminutor until the pH of the liquid phase was reduced to about 6.5. This addition of sulfuric acid took approximately 5 minutes. Then, the slurry was filtered and 62 g of cake was recovered. The increase in cake apparently was caused by the absorption of salts within the cellulose crumb. The xanthate sulfur percent on cellulose was 11.6% as measured by the Fock method. The product was a neutral sodium cellulose xanthate which is soluble in water and which will undergo a variety of nucleophilic additions and substitution reactions. The product is stable on storage.

EXAMPLE 3

A 50 g portion of alkali cellulose xanthate crumb from Example 1 (initial xanthate sulfur content 20 – 21%) was added to 500 ml. of a saturated solution of sodium chloride in water forming a mixture. The resulting mixture was added to a Waring blender and agitated. Then, concentrated hydrochloric acid was added drop-wise over a period of about 10 minutes until the agitated slurry reached a pH of 6. A total of 12.3 g hydrochloric acid were added over the 10-minute period. The resulting neutralized slurry was filtered and 83.4 g of cake was recovered. The percent xanthate sulfur on cellulose was 18%. The product was a neutral sodium cellulose xanthate which is soluble in water and which will undergo a variety of nucleophilic additions and substitution reactions. The product is stable on storage.

EXAMPLE 4

The process of Example 3 was carried out except that a 50 g portion of alkali cellulose xanthate crumb of Example 1 was added to 500 ml. of a 20% solution of sodium sulfate in water. 12.6 g hydrochloric acid was added drop-wise over a period of 10 minutes until the pH of the slurry was 5.1. On filtering, 115 g of cake were recovered and the percent xanthate sulfur on cellulose was 19.2%. The product was a neutral sodium cellulose xanthate which is soluble in water and which will undergo a variety of nucleophilic additions and substitution reactions. The product is stable on storage.

EXAMPLE 5

A 50 g portion of 200 D.P. (Degree of Polymerization) sodium cellulose xanthate crumb was added to a 500 ml. portion of 20% sodium sulfate in water in a Waring blender. The mixture was comminuted while incrementally adding 51.8 g of a solution containing 130 g/l $H_2SO_4$ and 270 g/l $Na_2SO_4$. This reduced the pH of the solution to 5. The resulting slurry was filtered and 89.5 g of cake were recovered. The pH of the solution of the xanthate salt in water was 8.5 and the sulfur content was 10.5%. The product was a neutral sodium cellulose xanthate which is soluble in water and which will undergo a variety of nucleophilic additions and substitution reactions. The product is stable on storage.

EXAMPLE 6

A 50 g portion of 200 D.P. cellulose xanthate crumb from Example 5 was added to 500 g portion of methyl ethyl ketone in a Waring blender. A 12 g portion of concentrated nitric acid was added drop-wise to the solution and simultaneously agitated in the Waring blender. After sufficient acid was added to reduce the pH of the mixture to about 8, the neutralization was stopped and the mixture filtered. The cake had a yellowish appearance and a xanthate sulfur concentration of about 10%. The product was a neutral sodium cellulose xanthate which is soluble in water and which will undergo a variety of nucleophilic additions and substitution reactions. The product is stable on storage.

EXAMPLE 7

A 50 g portion of 200 D.P. cellulose xanthate crumb from Example 5 was added to 500 ml. of mineral oil. The resultant mixture was added to a Waring blender and mixed and comminuted while adding about 12 g of concentrated aqueous nitric acid drop-wise over a period of 10 minutes. The pH of the xanthate solution was 11.5. On filtering, 64 g of cake were recovered which had a yellowish case and a xanthate sulfur concentration on cellulose of 11.5%. The product was a neutral sodium cellulose xanthate which is soluble in water and which will undergo a variety of nucleophilic additions and substitution reactions. The product is stable on storage.

EXAMPLE 8

A 40 g portion of cellulose xanthate crumb of Example 1 was added to 400 ml. dioxane and then mixed in a Waring blender. A 10% solution of sulfuric acid in dioxane was added drop-wise to the Waring blender until the calculated proportion of free alkali was neutralized. The solution was filtered and a cake recovered. On dissolving 2 g of cake in 98 g water, the pH of the resulting mixture was about 10.8 which illustrated that almost all of the free alkali in the cellulose xanthate was neutralized. The xanthate sulfur was about 12.3%. The product was a neutral sodium cellulose xanthate which is soluble in water and which will undergo a variety of nucleophilic additions and substitution reactions. The product is stable on storage.

EXAMPLE 9

A high purity amylose (derived from corn) containing about 10% water and having a DP of about 700 – 900 is used in the formation of an amylose xanthate analogous to the cellulose xanthate of Example 1.

An alkaline solution of 24% concentration (1,580 g water and 300 g sodium hydroxide) is prepared and mixed with 300 ml. methanol and 150 g amylose. The thick slurry which is formed is stirred for 10 minutes and 200 ml. additional methanol added and the more dilute slurry stirred for 1 hour at a temperature of about 25°C. The slurry then is mixed with 5.1 liters of methanol to precipitate and shrink the amylose. The supernatant layer is decanted and found to contain 270 g of sodium hydroxide, The gel which remains is left to dry in thin layers and to depolymerize or age. The alkali amylose which is produced is allowed to dry and age for 43 hours at 25°C to reduce the DP of the amylose so that high amylose xanthate concentrations in alkali could be obtained. The gel weight is about 870 g and comprises about 12.6% alkali, 16% amylose, and 71% water.

The alkali amylose (870 g) is spread on the bottom and on the porcelain plate of a 12 inch vacuum desiccator. Nitrogen purging is carried out and a vacuum is applied. About 70 g of carbon disulfide is drawn into the desiccator and the system allowed to stand in a water bath at 25°C. After about 5.25 hours, the alkali amylose has turned to a carrot yellow - orange color. A vacuum is applied to the desiccator to remove excess carbon disulfide for a period of about 20 minutes. The product obtained consists of 898 g of sodium amylose xanthate.

A 40 g portion of amylose xanthate having a particle size of about 24 mesh was added to 400 ml. of a 20% solution of sodium sulfate in water. A saturated solution of sodium bisulfate in water is added drop-wise to a Waring blender containing the amylose xanthate. The addition of sodium bisulfate is continued until the pH is about 10. The resulting contents then are filtered and amylose xanthate, substantially free of alkali, was recovered. The product was a neutral sodium amylose xanthate which is soluble in water and which will undergo a variety of nucleophilic additions and substitution reactions. The product is stable on storage.

EXAMPLE 10

In this example, sodium polyallyl alcohol xanthate is neutralized and converted to a dry stable powder.

The sodium polyallyl alcohol xanthate used in this example is prepared in accordance with the procedure of B. G. Ranby described in Die Macromolecular Chemie, November, 1960, Page 68 FF.

The sodium polyallyl alcohol xanthate is shredded to a particle size of about 24 mesh. The temperature maintained during shredding is about 25°C.

Forty grams of sodium polyallyl alcohol xanthate having a particle size of about 24 mesh is added to 300 ml. of isopropanol. This mixture is added to a Waring blender and then a 10% sulfuric acid in water solution is added drop-wise until the pH of the liquid phase is about 11. Then, the contents are filtered and a neutralized finely divided sodium polyallyl alcohol xanthate free of caustic is obtained. The product was a neutral sodium polyvinyl alcohol xanthate which is soluble in water and which will undergo a variety of nucleophilic additions and substitution reactions. The product is stable on storage.

EXAMPLE 11

In this example, sodium polyvinyl alcohol xanthate is neutralized into a finely divided stable powder.

The sodium polyvinyl alcohol xanthate used in this example is prepared in accordance with the procedure of B. G. Ranby described in Die Macromolecular Chemie, November, 1960, Page 68 FF.

The sodium polyvinyl alcohol xanthate is comminuted and neutralized in the same manner as the polyallyl alcohol described in Example 9. On filtering, a neutralized sodium polyvinyl alcohol xanthate is recovered. The product was a neutral sodium polyvinyl alcohol xanthate which is soluble in water and which will

What is claimed is:

1. A process for neutralizing a solid finely divided film-forming alkali metal polymeric alcohol xanthate containing free alkali and alkaline by-products, to form a neutral stable solid product in finely divided form which comprises:

adding, in small increments, a substantially stoichiometric quantity of strong acid based on the free alkali and alkaline by-product content in said xanthate to a liquid slurry of said finely divided alkali metal polymeric alcohol xanthate containing free alkali and alkaline by-products in an inert liquid vehicle in which the xanthate is substantially insoluble, and intimately mixing said acid and xanthate slurry at a rate sufficient to neutralize the free alkali and alkaline by-products without regenerating the polymeric alcohol.

2. The process of claim 1 wherein said polymeric alcohol xanthate is cellulose xanthate, amylose xanthate, polyvinyl alcohol xanthate or polyallyl alcohol xanthate, containing free alkali and alkaline thiocarbonate by-products.

3. The process of claim 1 wherein said strong acid is nitric, hydrochloric, sulfuric, or phosphoric acid.

4. The process of claim 3 wherein said acid is sulfuric.

5. The process of claim 1 in which said liquid vehicle is a concentrated aqueous salt solution.

6. The process of claim 1 in which said liquid vehicle is an organic solvent or mixture of a water-miscible organic solvent with water.

7. The process of claim 6 in which said liquid vehicle is an aliphatic or aromatic liquid hydrocarbon or mixtures of hydrocarbons, a liquid alcohol, ketone, or substituted acyl amide.

8. The process of claim 5 in which the neutralization is continued until the product xanthate recovered has a pH of 6 – 10 when redissolved in water at a 1% concentration.

9. The process of claim 6 in which the neutralization is continued until the product xanthate recovered has a pH of 6 – 10 when redissolved in water at a 1% concentration.

* * * * *